July 6, 1965    J. MEIER    3,193,036
PRECISION BALANCE
Filed Nov. 19, 1964
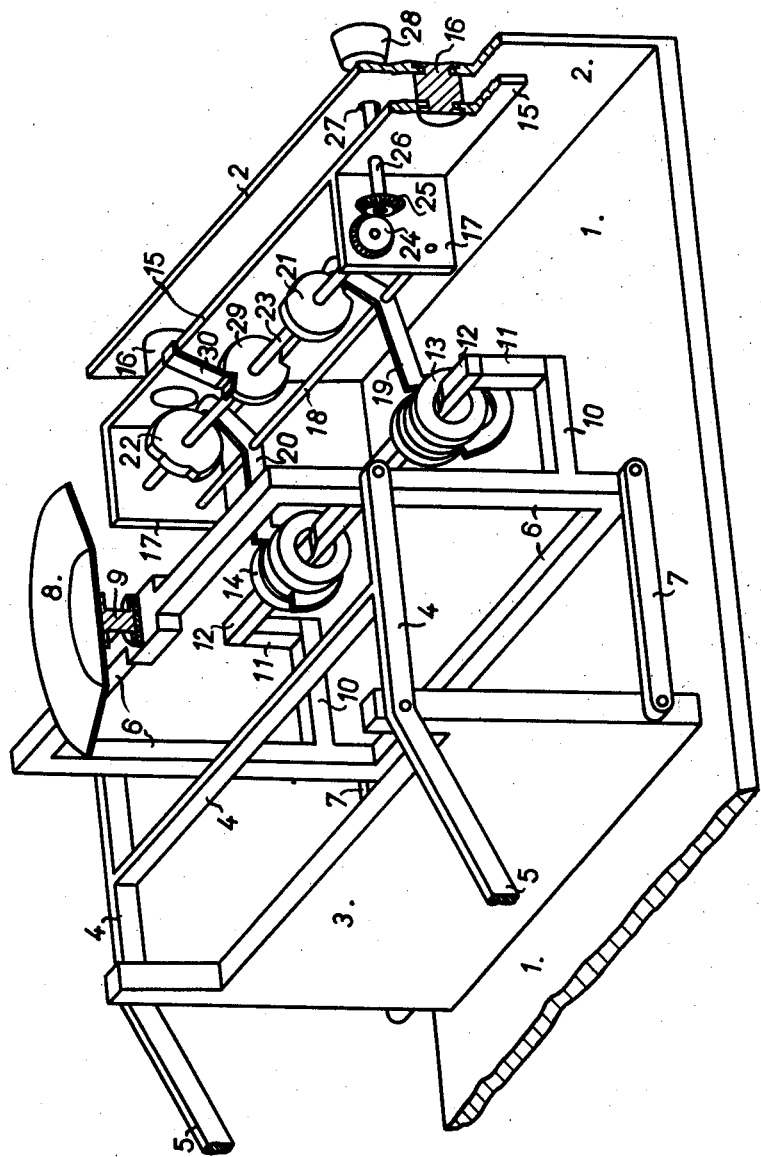
INVENTOR:
Johann Meier
BY:
Lawrence E. Laubscher
ATTORNEY.

United States Patent Office 3,193,036
Patented July 6, 1965

3,193,036
PRECISION BALANCE
Johann Meier, Stäfa, Switzerland, assignor to Mepag, A.G., Zurich, Switzerland, a corporation of Switzerland
Filed Nov. 19, 1964, Ser. No. 412,545
Claims priority, application Switzerland, June 9, 1964, 7,511/64
4 Claims. (Cl. 177—248)

This invention relates to a precision balance and more particularly to a balance having a beam pivotally mounted on a balance rack, a pan carrier suspended from the balance beam and supporting a scale pan, a receiving member attached to said pan carrier for supporting one or more control weights, and operable means for lifting-off the control weights from said receiving member.

In present day highly sensitive precision balances of this type mere actuation of the means for putting down and lifting the control weights may cause slight shaking which makes the weighing results less capable of being reproduced. The purpose of the invention is as far as possible to eliminate this phenomenon.

The present invention accordingly concerns a precision balance comprising a balance rack, a balance beam pivotally mounted on said rack, a pan carrier suspended from said beam and supporting a scale pan, a receiving member attached to said pan carrier for supporting one or more control weights, an intermediate support yieldingly attached to said rack by means of one or more shock-absorbers, actuating levers pivotally mounted on said intermediate support for lifting-off or putting down said control weights from or on said receiving member, a shaft rotatably mounted on said intermediate support, one or more camplates fixed to said shaft and co-operating with said actuating levers for raising and lowering the same in a pre-determined sequence, and locking means acting between said shaft and said intermediate support in order to establish a given number of rest positions of said shaft. Preferably said receiving member also is yieldingly attached to said pan carrier.

In order that the invention may be well understood there will now be described one embodiment thereof, given by way of example only, reference being made to the accompanying drawing which comprises a simplified diagrammatic perspective view of a precision balance according to the invention. For reasons of clarity all details not essential to the understanding of the invention have been omitted.

The rack of the balance, which is only partially shown, comprises a base plate 1, a front plate 2 and a plate like support 3 to which the balance beam is articulated. This beam is again shown only partially, the shorter arm 4 thereof being shown in its entirety. The non-illustrated end of the longer arm 5 of the beam carries the usual counter weight and means for reading its inclination in the form of a reticule or the like. Articulated to the shorter arm 4 of the beam is the frame like pan carrier 6 which is guided to have a parallelogrammatic motion by means of a steering lever or levers 7. This pan carrier 6 supports the scale pan 8 at the top, and between the scale pan 8 and the pan carrier 6 there is inserted a shock-absorber 9 made of rubber or other yielding material. Short prismatic rubber columns 11 are attached to transversely projecting extensions 10 from the pan carrier and their tops are joined to a cross-bar 12 designed as a receiving member for the control weights 13 and 14. The control weights are annular and contain a hole of a diameter such that the cross-bar 12 passes through them and takes only up a small portion of the cross-section of the hole. In the drawing the control weight 13 is seated on the cross-bar 12 and the other control weight 14 lifted-off the latter.

In contrast to the usual construction for such balances the means for raising and lowering the control weights 13 and 14 are not mounted directly on parts of the frame or rack of the balance. Instead they are mounted on an intermediate support 15 which is attached to the rack part 2 by means of shock-absorbing rubber cylinders 16. A shaft 18 is fixed in the transversely projecting bearing plates 17 of the intermediate support 15 and this shaft 18 has the pivoted actuating lever 19 and 20 separately and rotatably mounted on it. The longer arm of each actuating lever has a hook-shaped offset portion which, when the actuating lever is raised, can engage in an outer groove in the associated annular weight so as to lift the weight in question off the cross-bar 12, as illustrated in the drawing in the case of the control weight 14 and the lever 20. If on the other hand, the control weight 13 is seated on the cross-bar 12, then the hook-shaped offset portion of the corresponding lever 19 must be located far enough below the weight 13 to prevent any contact between the lever 19 and the weight 13 even when the pan carrier 6 is in its lowest position. Camplates 21 and 22 fixed on a shaft 23 are provided to pivot the actuating levers 19 and 20. The shaft 23 is rotatably mounted in the bearing plates 17 of the intermediate support and equipped with a bevel gear 24. The bevel gear 24 is engaged by a further bevel gear 25 mounted on a shaft 26 which is in turn rotatably mounted in the intermediate support 15. An aperture 27 is provided in the front plate 2 and is sufficiently large for the shaft 26 to extend freely through it to the outside with clearance. By means of the operating knob 28 fixed to the shaft 26 the camplates 21 and 22 can thus be turned and the actuating levers 19 and 20 thereby raised or lowered, so that the control weights 13 and 14 may be placed on the crossbar 12 or removed therefrom in a pre-determined sequence. In order that the various rest positions of the shaft 23 can be clearly established, a disc 29 containing notches is fixed on the shaft 23 and co-operates with a leaf spring 30 attached to the intermediate support 15.

For reasons of clarity the drawing shows only two control weights 13 and 14 with their associated actuating levers 19 and 20 and the corresponding camplates 21 and 22. But there is generally a larger number of control weights of different sizes and these can be correspondingly deposited on or lifted-off the cross-bar 12 in a pre-determined sequence provided that the operating knob 28 is turned accordingly. When the knob 28 is turned and the levers 19 and 20 are swung up and down more or less abruptly depending on the rotary speed of the shaft 26 that the intermediate support 15 is shaken accordingly. Similar engagement of the spring 30 in the notches in the disc 29 gives rise to smaller shakings of the intermediate support 15. With the intermediate support 15 fixed to the front plate 2 by rubber cylinders 16 in a yielding and shock-absorbing manner, shaking occurring at the support 15 can virtually not be transmitted to the rack 1 to 3 of the balance, and thus can have no harmful effect on the reproducibility of the weighing result. Impacts do also occur at the moment when one of the control weights 19 or 20 is deposited on the cross-bar 12 of the span carrier. But in the case of smaller control weights these shocks are slight as compared with the shaking caused by abrupt swinging of the levers 19 and 20. Only in the case of heavier control weights can these shocks caused by the depositing thereof assume too large proportions. In order to prevent harmful reactions on the pan carrier 6 the cross-bar 12 is attached thereto in a shock-absorbing manner by means of the rubber columns 11 as described. Finally, in order that impacts resulting from sudden inexpert depositing of the articles to be weighed on the scale pan 8 can be made harmless, the shock-absorber 9, preferably made of rubber, is provided between the scale pan and the pan carrier.

Thus the mostly inevitable shaking caused by operation of the balance is made ineffective by the measures described to such an extent that the measuring results even of a very sensitive precision balance can virtually have the desired degree of reproducibility.

I claim:

1. A precision balance comprising a balance rack, a balance beam pivotally mounted on said balance rack, a pan carrier suspended from said balance beam, a steering lever acting between said balance rack and said pan carrier for guiding the same to have a parallelogrammatic motion, a receiving member for supporting one or more control weights, said receiving member being yieldingly attached to said pan carrier by means of shock-absorbing means, an intermediate support yieldingly attached to said balance rack by means of further shock-absorbing means, one or more actuating levers pivotally mounted on said intermediate support and adapted to lift off said control weights from said receiving member, and one or more camplates rotatably mounted on said intermediate support for raising and lowering said actuating levers.

2. A precision balance as recited in claim 1 comprising in addition a scale pan which is yieldingly attached to said pan carrier by means of a shock-absorber.

3. A precision balance comprising a balance rack, a balance beam pivotally mounted on said balance rack, a pan carrier suspended from said balance beam and supporting a scale pan, a receiving member attached to said pan carrier for supporting a plurality of control weights, an intermediate support yieldingly attached to said balance rack by means of a plurality of shock-absorbers, a plurality of actuating levers pivotally mounted on said intermediate support for lifting-off said control weights from said receiving member, a shaft rotatably mounted on said intermediate support, a plurality of camplates fixed to said shaft for raising and lowering said actuating levers in a predetermined sequence, and the locking means acting between said shaft and said intermediate support in order to establish a given number of rest positions of said shaft.

4. A precision balance as recited in claim 3 comprising gear means rotatably mounted on said intermediate support for rotating said shaft.

References Cited by the Examiner
UNITED STATES PATENTS

| | | | |
|---|---|---|---|
| 1,145,427 | 7/15 | Levenberger et al. | 177—248 |
| 1,542,579 | 6/25 | Pool | 177—204 |
| 2,368,655 | 2/45 | Fraps | 177—248 X |
| 2,614,825 | 10/52 | Kadlec et al. | 177—191 X |
| 2,662,762 | 12/53 | Meinig | 177—191 X |
| 3,004,618 | 10/61 | Meier | 177—248 |
| 3,047,083 | 7/62 | Chyo | 177—191 X |
| 3,055,444 | 9/62 | Chyo | 177—191 |

FOREIGN PATENTS

| | | |
|---|---|---|
| 365,553 | 12/62 | Switzerland. |

LEO SMILOW, Primary Examiner.